United States Patent
Ashmore

(10) Patent No.: US 7,921,301 B2
(45) Date of Patent: Apr. 5, 2011

(54) METHOD AND APPARATUS FOR OBSCURING DATA ON REMOVABLE STORAGE DEVICES

(75) Inventor: Paul Andrew Ashmore, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 1168 days.

(21) Appl. No.: 11/131,665

(22) Filed: May 17, 2005

(65) Prior Publication Data

US 2006/0294289 A1 Dec. 28, 2006

(51) Int. Cl.
*G06F 11/30* (2006.01)

(52) U.S. Cl. ............ 713/190; 713/189; 711/100; 380/9; 380/239

(58) Field of Classification Search .................. 713/190, 713/189, 176, 164, 175, 162; 380/29, 28, 380/259, 37, 256, 277, 44, 45, 42, 200, 229, 380/9, 239; 711/100
See application file for complete search history.

(56) References Cited

U.S. PATENT DOCUMENTS

| | | | | |
|---|---|---|---|---|
| 5,216,357 A | | 6/1993 | Coppola et al. | |
| 5,341,493 A | * | 8/1994 | Yanai et al. | 711/161 |
| 5,581,614 A | * | 12/1996 | Ng et al. | 380/239 |
| 5,734,721 A | * | 3/1998 | Clark | 380/46 |
| 6,826,111 B2 | | 11/2004 | Schneider et al. | |
| 6,829,614 B2 | | 12/2004 | Fujishima et al. | |
| 2002/0012525 A1 | * | 1/2002 | Yuen et al. | 386/69 |
| 2002/0040420 A1 | * | 4/2002 | Yamauchi et al. | 711/118 |
| 2002/0108048 A1 | * | 8/2002 | Qi et al. | 713/189 |
| 2002/0126544 A1 | * | 9/2002 | Holmes et al. | 365/200 |
| 2003/0072446 A1 | * | 4/2003 | Jaquette | 380/46 |
| 2003/0144965 A1 | * | 7/2003 | Prasad et al. | 705/65 |
| 2003/0182429 A1 | * | 9/2003 | Jagels | 709/227 |
| 2003/0184455 A1 | * | 10/2003 | Hayami | 341/59 |
| 2004/0103355 A1 | * | 5/2004 | Correale et al. | 714/733 |
| 2004/0117562 A1 | * | 6/2004 | Wu et al. | 711/147 |
| 2006/0002197 A1 | * | 1/2006 | Rudelic | 365/189.09 |
| 2006/0126838 A1 | * | 6/2006 | Taieb et al. | 380/229 |
| 2007/0253551 A1 | * | 11/2007 | Guillot et al. | 380/200 |

OTHER PUBLICATIONS

International Preliminary Report on Patentability for corresponding International Application No. PCT/US06/15877, Nov. 29, 2007, 7 pages.
Written Opinion of International Searching Authority for corresponding International Application No. PCT/US06/15877, Apr. 16, 2007, 6 pages.
International Search Report for corresponding International Application No. PCT/US06/15877, Apr. 16, 2007, 4 pages.

* cited by examiner

*Primary Examiner* — Taghi T Arani
*Assistant Examiner* — Jason Lee
(74) *Attorney, Agent, or Firm* — Thomas J. Lavan; Bradley Knepper

(57) ABSTRACT

A method and apparatus for obscuring data held on a storage device associated with a storage system controller are provided. Data is obscured by swapping bit values according to a scrambling key, before the unit of data is stored on the storage device. Furthermore, multiple swaps or translations of bit values can be performed in sequence on a single unit of data. In order to descramble a unit of data, the translations of bit values applied during scrambling are performed in reverse order. Alternatively or in addition, data can be obscured by scrambling the bit values of an address associated with a unit of data.

21 Claims, 7 Drawing Sheets

| | |
|---|---|
| UNIT OF DATA (ORIGINAL FORM): | 0100 1001 ─── 704 |
|    PERFORM FIRST TRANSLATION<br>   (SWAP VALUES OF BITS 2 AND 6) | ↓↑ ─── 708 |
| FIRST TRANSLATED FORM: | 0000 1101 ─── 712 |
|    PERFORM SECOND TRANSLATION<br>   (SWAP VALUES OF BITS 1 AND 2) | ↓↑ ─── 716 |
| SECOND TRANSLATED FORM: | 0000 1011 ─── 720 |
|    PERFORM THIRD TRANSLATION<br>   (SWAP VALUES OF BITS 5 AND 4) | ↓↑ ─── 724 |
| THIRD TRANSLATED FORM: | 0000 1011 ─── 728 |
|    PERFORM FOURTH TRANSLATION<br>   (SWAP VALUES OF BITS 5 AND 1) | ↓↑ ─── 732 |
| FOURTH TRANSLATED FORM: | 0010 1001 ─── 736 |
|    PERFORM FIFTH TRANSLATION<br>   (SWAP VALUES OF BITS 0 AND 3) | ↓↑ ─── 740 |
| SCRAMBLED UNIT OF DATA<br>(FIFTH TRANSLATED FORM): | 0010 1001 ─── 744 |

FIG.7

METHOD AND APPARATUS FOR OBSCURING DATA ON REMOVABLE STORAGE DEVICES

BACKGROUND

The need to store digital files, documents, pictures, images and other data continues to increase rapidly. In connection with the electronic storage of data, various systems have been devised for the rapid and secure storage of large amounts of data. Such systems may include a number of storage devices that are used in a coordinated fashion. In particular, data can be distributed across multiple storage devices such that data will not be irretrievably lost if one of the storage devices (or in some cases, more than one storage device) fails. An additional advantage that can be achieved by coordinating operation of a number of individual storage devices is improved data access and/or storage times. Examples of systems that can provide such advantages can be found in the various RAID (redundant array of independent disks) levels that have been developed.

Many data storage systems, such as RAID array systems, utilize one or more controllers. Such controllers typically provide a read cache and a write cache to improve the performance of the data storage system with respect to input/output (IO) operations. For example, in connection with write operations, a host can provide data for storage that is initially placed in the write cache of a data system controller. Once the data has been placed in the write cache, the controller indicates to the host that the write operation has been completed, even though the data has not yet been stored on a data storage device or devices. This frees the host to move on to other operations while the controller completes the relatively slow process of storing the data that has been placed in the write cache on the storage device or devices.

In many applications, the availability of data is a key concern. In particular, in many applications, users rely heavily on the data stored in the data storage system. In these types of applications, unavailability of data stored on the data storage system can result in significant loss of revenue and/or customer satisfaction. Employing a data storage system comprising a RAID array can enhance the availability of the stored data, since if a single disk drive fails, data may still be stored and retrieved from the system. In addition to the use of a RAID system, it is common to use redundant RAID controllers to further enhance the availability of a storage system. In such a situation, two or more controllers are used such that, if one of the controllers fails, the remaining controller will assume operations of the failed controller. The availability of the data storage system is therefore enhanced, because it can sustain a failure of a controller and continue to operate. When using dual controllers, each controller may conduct independent read and write operations simultaneously. This is known as an active-active configuration. In active-active configuration, write-back data and associated parity data are mirrored between the controllers.

SUMMARY

Embodiments of the present invention are directed to protecting cached data that has been written to a non-volatile storage device from unauthorized access. In particular, should a power outage occur, data that has been placed in the write cache of a controller is vulnerable to being lost. Furthermore, even though battery back-up power may be available for short periods of time, data in the cache may eventually be lost if the power outage is prolonged. In order to protect such data, it can be dumped to a non-volatile storage device by the controller, and/or by the operation of hardware provided as part of a controller. In accordance with embodiments of the present invention, the non-volatile storage device is removable. A removable non-volatile storage device can facilitate restoring data that had been in a controller's write cache, for example where the controller that had been associated with the non-volatile storage needs to be replaced. In accordance with embodiments of the present invention, when a unit of data is presented from the memory or cache of the controller to the non-volatile storage device, it is translated or scrambled, in order to protect against access to the data by an unauthorized user. The scrambling can include scrambling the data lines of the unit of data, and/or the scrambling of the address lines for the unit of data.

In accordance with embodiments of the present invention, the unit of data, such as, but not limited to, a byte or word of data, is translated by scrambling at least some of the bits comprising the unit of data. Furthermore, the scrambling may be controlled by a configuration register that can hold a value that is unique to the associated controller, to the data storage system, and/or to a data storage device. The configuration register may further comprise one or more mapping registers that each contain two values. These values may correspond to a pair of bits within the unit of data. Furthermore, the values may identify bits within the unit of data whose values are to be swapped with one another. In accordance with embodiments of the present invention, one set of mapping registers may be defined for the data bus to perform scrambling of the unit of data, while another set of mapping registers may be defined for the address bus to perform scrambling of the address for a unit of data.

In accordance with still other embodiments of the present invention, a set of mapping registers for the data bus and/or a set of mapping registers for the address bus may include multiple value pairs. If a set of mapping registers comprises multiple value pairs, the swapping of bit values indicated by the value pairs is performed sequentially, in a set or defined order. By applying multiple value pairs in sequence, the scrambling of the unit of data or the address of the unit of data can be made more difficult to defeat. In order to descramble a unit of data or an address of a unit of data that has been scrambled using multiple value pairs, those value pairs are applied to the unit of data or to the address of the unit of data, as appropriate, in a sequence that is the reverse of the sequence used to scramble the unit of data or the address for the unit of data.

In accordance with embodiments of the present invention, the mapping register values comprise one or more scrambling keys (or portions of one or more scrambling keys) that are stored on one or more of the data storage devices included in a data storage system. In order to enable a controller to utilize the values in the mapping registers to obscure data that is written to non-volatile memory, for example in response to a power outage affecting the data storage system, the mapping registers are written to or comprise registers on the controller, but not on the non-volatile storage device associated with the controller. The value pairs held in the mapping registers may be used in connection with the configuration of logic included in or associated with the controller to perform the indicated bit swaps in a particular order. In accordance with embodiments of the present invention, in order to retrieve data that has been written to non-volatile storage, the controller may retrieve the scrambling key or keys from the data storage device or devices, and use that data to load the mapping registers to configure logic on the controller for performing descrambling.

BRIEF DESCRIPTION OF THE DRAWINGS

FIG. 7 illustrates the scrambling (and descrambling) of an example unit of data in accordance with an exemplary embodiment of the present invention.

DETAILED DESCRIPTION

Figure 1:
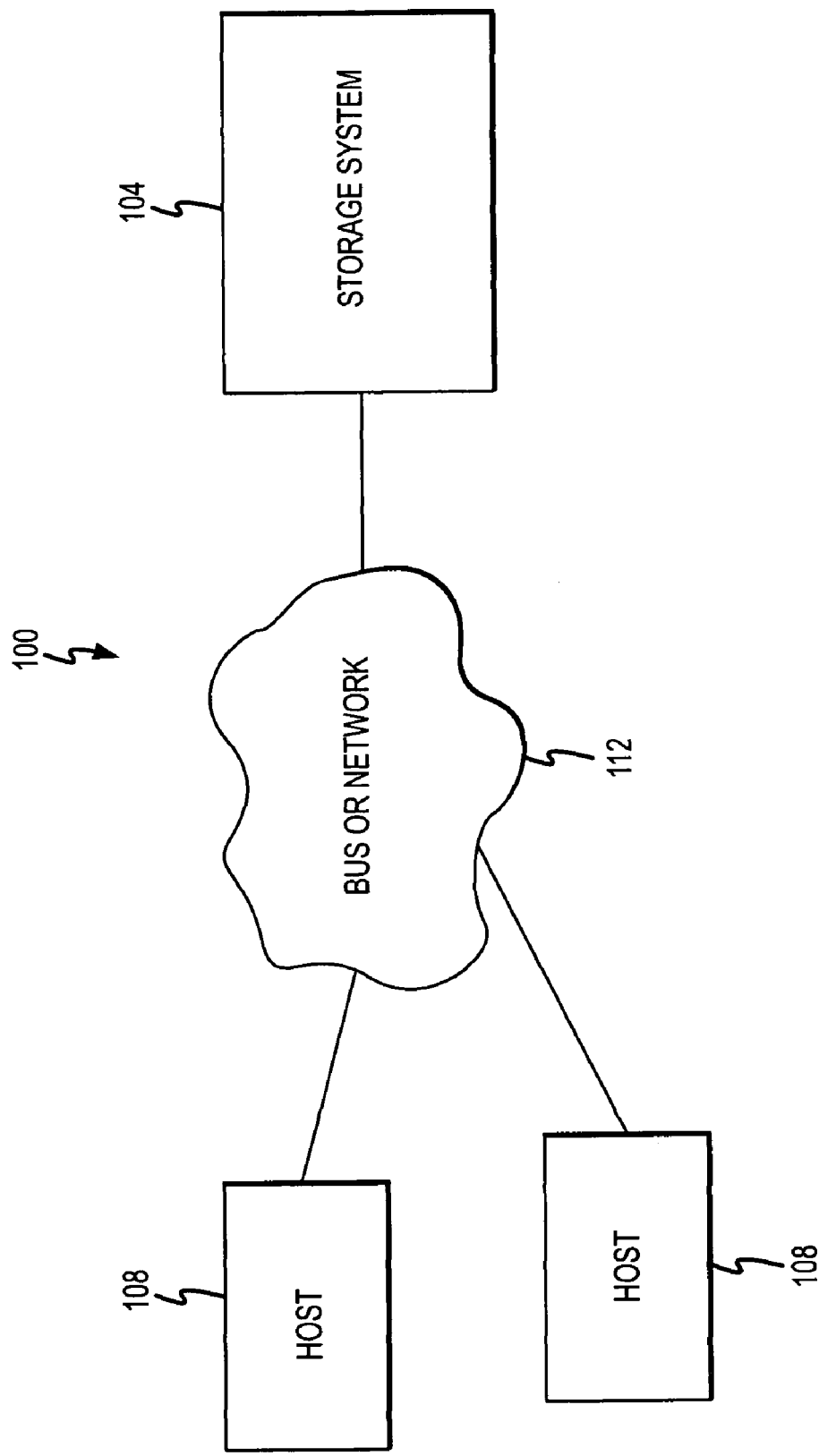
FIG. 1 is a functional block diagram depicting components of an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a bus and/or network 112. Accordingly, embodiments of the present invention have applications in association with single or multiple hosts 108 in storage area network (SAN) or direct connect environments. In accordance with still other embodiments, a data storage system 104 may be integrated with or directly connected to a host 108.

Figure 2:
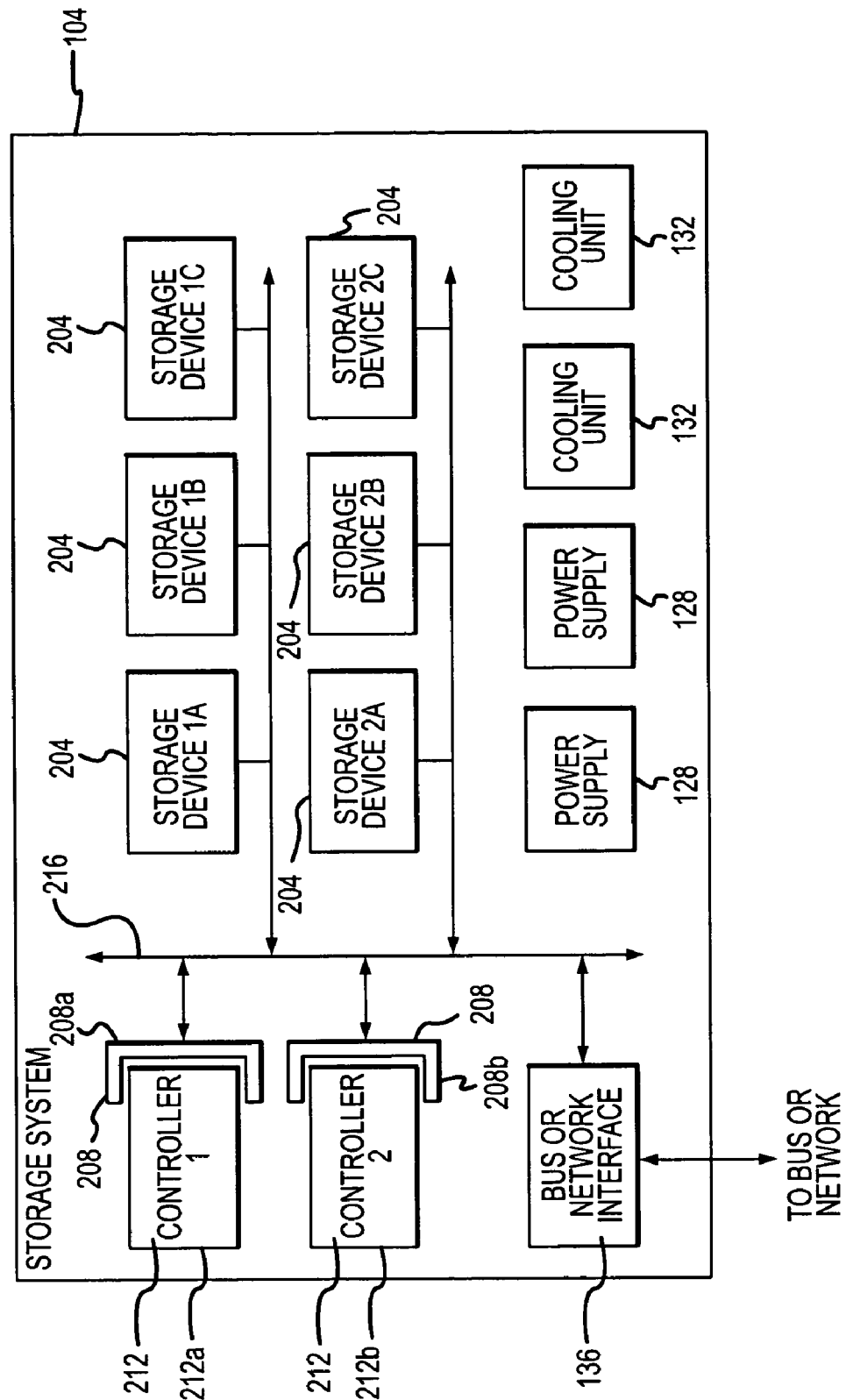
FIG. 2 is a block diagram depicting components of a data storage system in accordance with embodiments of the present invention.

With reference now to FIG. 2, components that may be included in a data storage system 104 in accordance with embodiments of the present invention are illustrated. In general, the data storage system 104 includes a number of storage devices 204. Examples of storage devices 204 include hard disk drives, such as serial advanced technology attachment (SATA), small computer system interface (SCSI), serial attached SCSI (SAS), fiber channel (FC) or parallel advanced technology attachment (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices, and that a lesser or greater number of storage devices 204 may be provided as part of a data storage system 104. As can be appreciated by one of skill in the art, arrays and/or array partitions, hereinafter referred to as logical unit numbers (LUNs) may be established on the data storage devices 204. As can further be appreciated by one of skill in the art, a LUN may be implemented in accordance with any one of the various RAID array levels or other arrangements for storing data on one or more storage devices 204.

A data storage system 104 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104. Furthermore, a data storage system 104 in accordance with embodiments of the present invention includes at least one controller 212a. For example while the data storage system 104 is operated in a single controller, non-failover mode, the data storage system 104 may include exactly one controller 212. A data storage system 104 may also be operated in a dual redundant active-active controller mode (hereinafter simply referred to as a dual controller mode) by providing a second controller 212b. When a second controller 212b is used in addition to a first controller 212a, the second controller 212b is received by the second controller slot 208b. As can be appreciated by one of skill in the art, the provision of two controllers 212a-b permits data to be mirrored between the controllers 212a-b, providing redundant active-active controller operation. As can also be appreciated by one of skill in the art, a controller slot 208 may be configured such that a controller 212 may be removed from or added to the data storage system 104 relatively easily, to facilitate upgrade and/or maintenance operations. For example, a controller slot 208 may facilitate the provision of a controller 212 as a field replaceable unit (FRU) that can be added to the data storage system 104 or replaced as part of a plug-in type operation.

One or more buses or channels 216 are generally provided to interconnect a controller or controllers 212, through the associated controller slot or slots 208, to the storage devices 204. Furthermore, while illustrated as a single shared bus or channel 216, it can be appreciated that a number of dedicated and/or shared buses or channels may be provided. Additional components that may be included in a data storage system 104 include one or more power supplies 128 and one or more cooling units 132. In addition, a bus or network interface 136 may be provided to interconnect the data storage system 104 to the bus or network 112.

Figure 3:
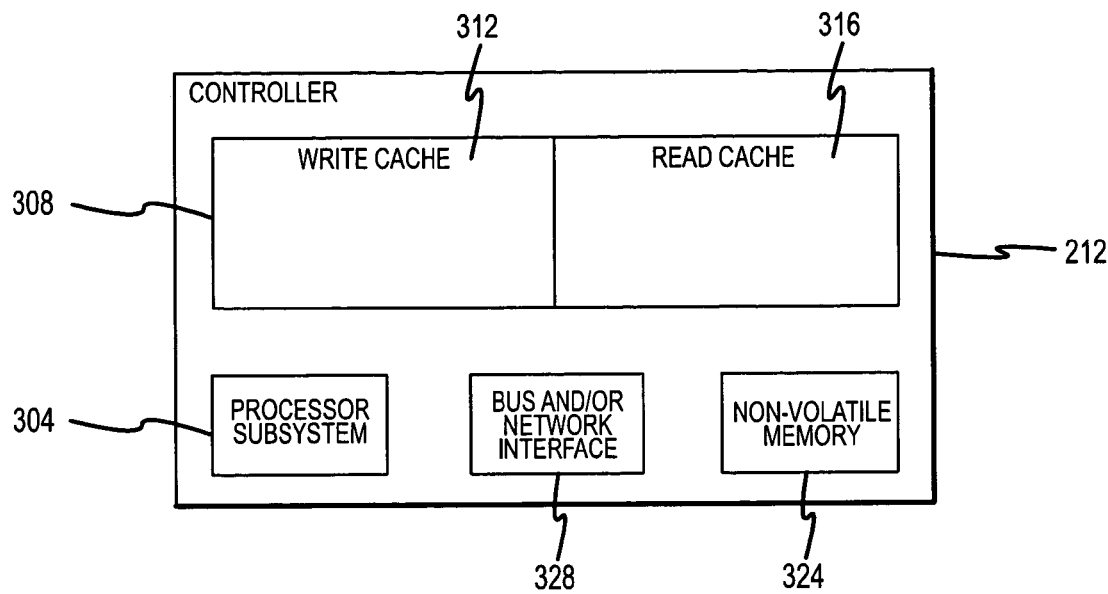
FIG. 3 is a block diagram depicting a controller of a data storage system in accordance with embodiments of the present invention.

With reference now to FIG. 3, aspects of a controller 212 in accordance with embodiments of the present invention are illustrated. In general, a controller 212 includes a processor subsystem 304 capable of executing instructions for performing, implementing and/or controlling various controller 212 functions. Such instructions may be stored as software and/or firmware. As a further example, operations concerning the generation of parity data may be performed using hardwired and/or programmable logic circuits provided as part of the processor subsystem 304. Accordingly, the processor subsystem 304 may be implemented as a number of discrete components, such as one or more programmable processors in combination with one or more logic circuits. The processor subsystem 304 may also include or be implemented as one or more integrated devices.

A controller 212 also generally includes memory 308. The memory 308 is typically divided or partitioned into at least first and second partitions comprising a write cache 312 and a read cache 316. As can be appreciated by one of skill in the art, by providing caches 312, 316, a controller can improve the speed of input/output (IO) operations between a host 108 and the data storage devices 204 comprising an array or array partition. As can further be appreciated by one of skill in the art, a controller 308 typically reports to the relevant host 108 that a write operation has been completed after data associated with that operation has been written to the write cache 312. As can also be appreciated by one of skill in the art, the indication that a write operation has been completed will generally be given to the host even though data has not yet been successfully written to a data storage device or devices 204. Therefore, while providing this early indication of the completion of a write is advantageous in that it allows the host 108 to discard the data provided as part of the write operation, improving overall data system 100 performance, it risks the loss of that data should the controller 212, the target device or devices 204, the bus or channel 216 interconnecting the controller 212 to the source device or devices 204, or some other component or operation fail. For this reason, it is often considered desirable to provide dual redundant controllers 212 in which data comprising a write operation being primarily handled by one controller 212 is mirrored to a partner controller 212. The memory 304 is not specifically limited to memory of any particular type. For example, the memory 308 may comprise a solid state memory device. As a further example, the memory 308 may comprise a number of solid state memory devices.

Furthermore, a controller 212 in accordance with embodiments of the present invention may include or be associated with non-volatile memory 324. Such non-volatile memory 324 may be used to store data that was written to the write cache 312 of memory 308 in the event of a power outage affecting the data storage system 104. In particular, in the event of a power outage, data held by the write cache 312, which is typically provided by memory 308 that requires power in order to retain data, is written or copied by the processor subsystem 304 to non-volatile memory 324 under battery or backup power. In addition, other information such as an identifier associated with the controller 212 and/or data storage systems 104 may be stored in the non-volatile memory 324 to identify that memory 324. The non-volatile memory 324 may include any type of data memory device that is capable of retaining data without requiring power from an external source. Furthermore, embodiments of the present invention utilize non-volatile memory 324 that can be easily removed, for example to facilitate the recovery of data. Examples of non-volatile memory 324 include, but are not limited to, Compact Flash or other standardized non-volatile memory devices.

A controller 212 may additionally include other components. For example, a bus and/or network interface 328 may be provided for operably interconnecting the controller 212 to the remainder of the data storage system 104, for example through a controller slot 208 and a bus or channel 216. Furthermore, the interface 328 may be configured to facilitate removal or replacement of the controller 212 in a controller slot 208 as a field replaceable unit (FRU). In addition, integral signal and power channels may be provided for interconnecting the various components of the controller 212 to one another.

Figure 4:
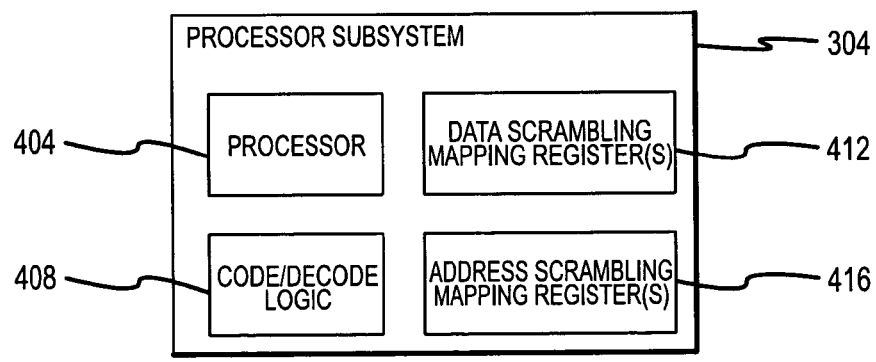
FIG. 4 is a block diagram depicting a processor subsystem of a controller in accordance with embodiments of the present invention.

With reference now to FIG. 4, components that may be included as part of a processor subsystem 304 in accordance with embodiments of the present invention are depicted. Such components may include a processor 404 capable of executing instructions in connection with performing, implementing and/or controlling various controller 212 functions. Such instructions may be stored as software and/or firmware. Functions of the processor 404 may perform or control, for example, the distribution of data across multiple storage devices 204, the generation of data scrambling keys, the detection of power outages and the transfer of data held in the write cache 312 to non-volatile memory 324 in response to the detection of power outages. Further example functions of the processor 404 include controlling the retrieval of scrambled data from non-volatile memory 324 after restoration of power is detected. In addition, code/decode logic 408 may be included for scrambling and descrambling units of data and/or the addresses of units of data. Code/decode logic 408 may comprise one or more programmable shift registers. The code/decode logic 408 may alternatively be implemented through suitable programming of the processor 404. One or more data scrambling mapping registers 412 and one or more address scrambling mapping registers 416 may also be included in the processor subsystem 304. In general, mapping registers 412, 416 function to hold instructions related to the data or address scrambling operations that are to be performed by the code/decode logic 408 with respect to units of data and/or an address associated with each unit of data. Such instructions may comprise all or a portion of a data scrambling key, and may further comprise one or more pairs of values designating bits within data, such as a unit of user data or a data address, the values of which are to be swapped. Furthermore, the mapping registers 412, 416 are generally configured such that they will not retain data after a loss of power. More particularly, when a controller 212 is powered on, for example after a power outage has occurred, or after an initial boot-up, data and address scrambling and descrambling key information must be obtained from one or more of the data storage devices 204, or some other location external to the controller 212, and placed in the mapping registers 412, 416. In general, the key information may be stored somewhere external to the controller so that the scrambled information stored in non-volatile memory 324 can be descrambled, even if the controller 212 with which the non-volatile memory 324 was associated when the scrambled information was stored has failed and been replaced. The mapping registers 412, 416 may be provided as memory independent from other components of the processor subsystem 304. As a further example, the mapping registers 412, 416 may be provided by memory included in the processor 404, such as where the processor 404 is implemented using a microcontroller. Furthermore, although various discrete devices can be used to implement a processor subsystem 304 in accordance with embodiments of the present invention, other embodiments of a processor subsystem 304 may include components that are at least partially integrated. For example, a processor subsystem 304 may incorporate or be implemented as an integrated controller, digital signal process (DSP) or application specific integrated circuit (ASIC).

Figure 5:
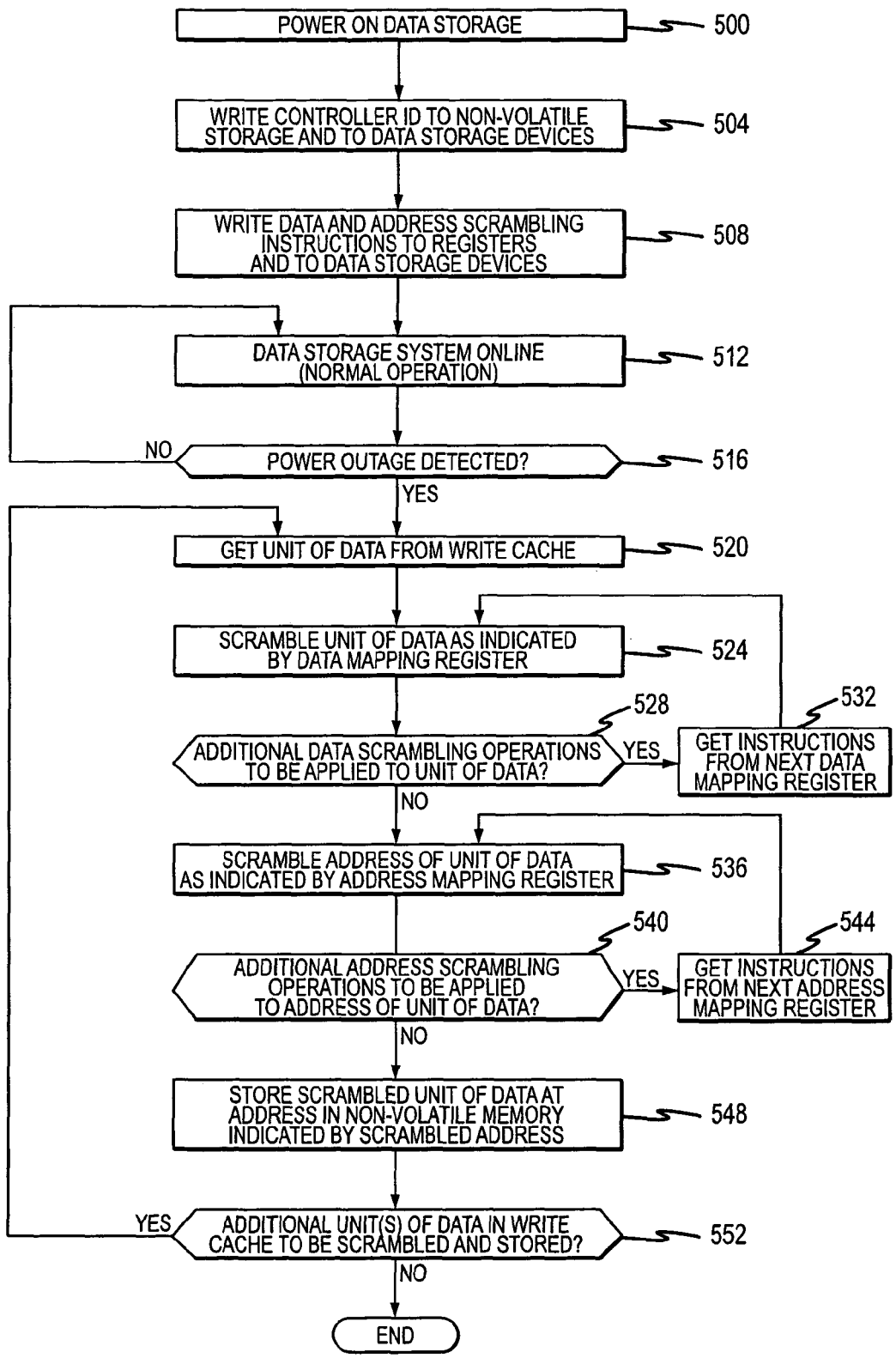
FIG. 5 is a flowchart illustrating aspects of the operation of a data storage system in connection with scrambling data in accordance with embodiments of the present invention.

With reference now to FIG. 5, aspects of the operation of a data storage system 104 in accordance with embodiments of the present invention are illustrated. Initially, at step 500, the data storage system 104 is powered on. A controller 212 identifier (ID) may then be written to non-volatile memory or storage 324 and to one or more of the data storage devices 204 included in the data storage system 104 (step 504). In addition, after powering up the data storage system 104, a scrambling key or keys for scrambling data comprising one or more units of user data and/or one or more data addresses may be generated and may be written to one or more of the data storage devices 204 and to mapping registers 412, 416 (step 508). As used herein, data or a piece of data may comprise a unit of data (for example a byte or word of user data) or an address for a unit of data. In general, the scrambling key may comprise some or all of the data and/or address scrambling instructions needed to perform a particular scrambling or descrambling operation or set of operations. The scrambling key can be generated by a host 108, controller 212, or by other means, automatically or in response to instructions received from a user or administrator. Furthermore, as can be appreciated by one of skill in the art, various techniques may be utilized to generate a scrambling key randomly or pseudo-randomly. For instance, a scrambling key can be generated by performing an XOR operation between a binary representation of the controller 212 identifier and a binary representation of the current time and date. Such an operation can be performed by, for example, the processor subsystem 304 of a controller 212. Furthermore, the scrambling key thus obtained can be used to define or designate parameters of a sequence of scrambling operations. For example, where a unit of data comprises a byte of data, and a 32 bit scrambling key has been generated, that 32 bit key can be divided up into five pairs of three bit quantities. The pairs of three bit quantities may then be used to define or designate the bits within a byte of data whose values are to be swapped. Accordingly, a 32 bit scrambling key can be used to define a sequence of five bit scrambling operations to be performed on a unit of data comprising a byte of data in order to obscure that information, as described in greater detail elsewhere herein. Furthermore, the bit pairs defined by the scrambling key can each be stored in their own register or position within the register 412 and/or 416. The understanding that the scrambling key defines pairs of bits whose values are to be swapped may be encoded within the processor subsystem of a controller.

The data storage system 104 may then be placed online to receive and respond to IO requests from a host 108 (step 512). At step 516, a determination may be made as to whether a power outage affecting the data storage system 104 has been detected. For example, it may be determined whether the data storage system 104 or components of that system 104 are operating on battery or backup power. If a power outage has not been detected, the data storage system 104 may return to step 512 and continue to operate normally.

If a power outage has been detected, a unit of data may be obtained from the write cache 312 of the controller (step 520). The unit of data may then be scrambled as indicated by the information held in the data mapping register 412 (step 524). In general, the scrambling operation with respect to the unit of data comprises swapping the values of at least two bits of the unit of data identified or designated by the information held in the data mapping register 412. At step 528, a determination may be made as to whether additional data scrambling operations are defined by the information held in the data mapping register 416 that remain to be applied to the unit of data. If additional data scrambling operations remain to be applied, instructions from the next data mapping register are obtained (step 532). That is, the next register values indicating the positions of the next two bits whose values are to be swapped are obtained. The bits of the unit of data, as scrambled by the previous data scrambling operation, are then further scrambled according to the next set of data scrambling instructions received at step 532. That is, a number of data scrambling (i.e., bit swapping) operations may be performed on a unit of data in sequence.

After all data scrambling operations to be applied to the unit of data have been applied, the address of the unit of data may be scrambled as indicated by the address mapping register (step 536). In general, the scrambling operation with respect to the address of the unit of data comprises swapping the values of at least two bits of the address identified by the information held in the address mapping register 416. At step 540, a determination may be made as to whether additional address scrambling operations that are defined by the information held in the address mapping register 416 remain to be applied to the address of the unit of data. If additional address scrambling operations remain to be applied, the next set of instructions are obtained from the address mapping register 416 (step 544). The next set of address mapping register instructions are then applied to the data address, as scrambled by the previous set of address scrambling instructions.

Accordingly, it can be appreciated that multiple address scrambling operations can be applied in sequence to a data address to obscure the actual address of a unit of data. After all address scrambling operations have been applied to an address of a unit of data, the scrambled unit of data is stored at the address in the non-volatile memory 324 indicated by the scrambled address (step 548).

At step 552, a determination may be made as to whether additional units of data remain in the write cache to be scrambled and stored. If additional units of data remain in the write cache, the process may return to step 520. If no units of data remain in the write cache 312, the process of scrambling and writing data to non-volatile memory 324 in accordance with embodiments of the present invention may end.

Figure 6:
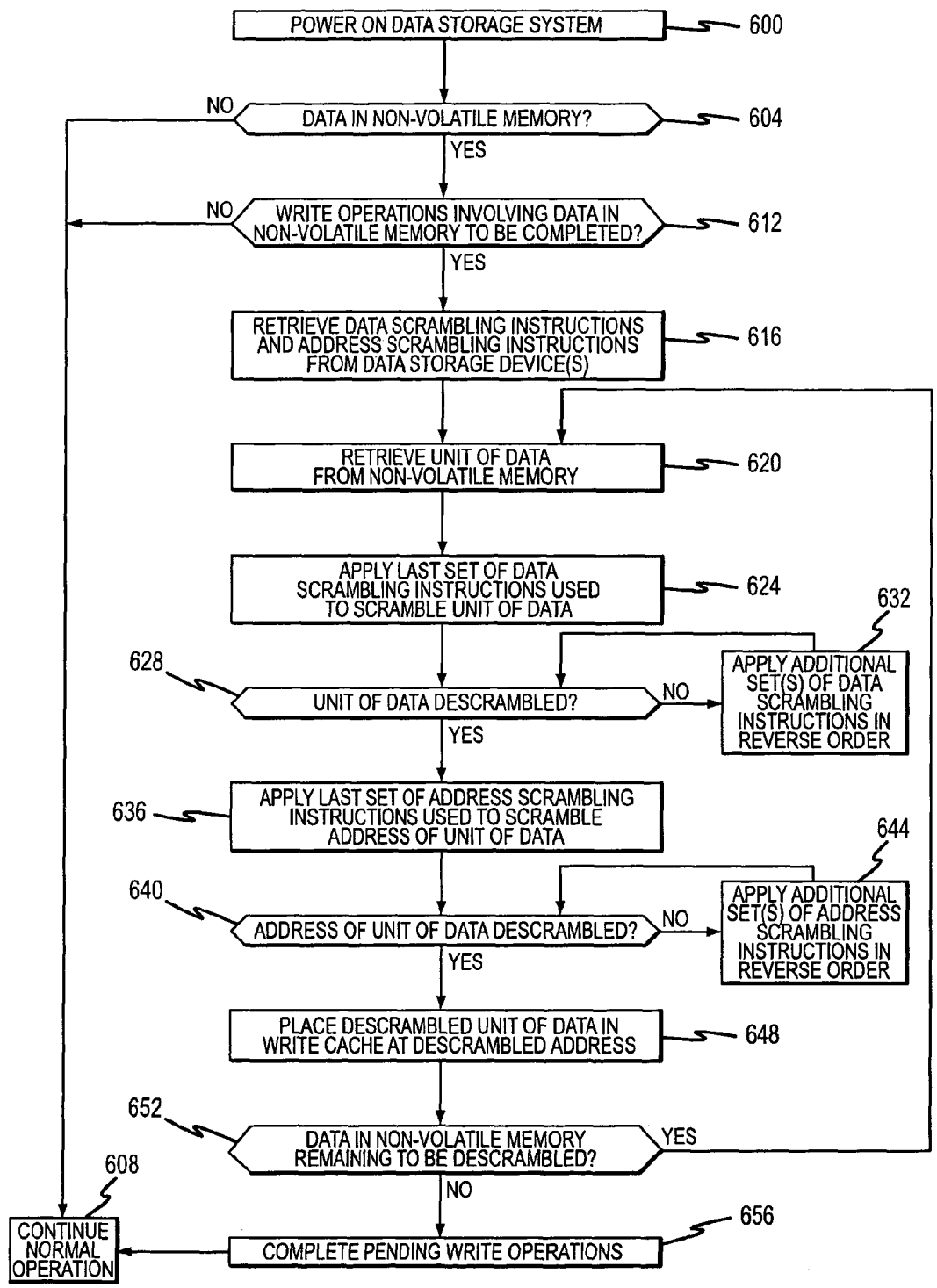
FIG. 6 is a flowchart illustrating aspects of the operation of a data storage system in connection with descrambling data in accordance with embodiments of the present invention.

With reference now to FIG. 6, aspects of the operation of a data storage system 104 in connection with retrieving scrambled data written to non-volatile memory 324 in accordance with embodiments of the present invention are illustrated. Initially, at step 600, the data storage system 104 is powered on. For example, normal power may be restored to the data storage system 104. A determination may then be made as to whether the non-volatile memory 324 in data storage system 104 controller 212 contains data (step 604). If no data is contained in the non-volatile memory 324, the data storage system 104 may resume normal operations (step 608). According to further embodiments of the present invention, determining whether the non-volatile memory 324 contains data may comprise retrieving an identifier stored in the non-volatile memory 324 and determining whether the non-volatile memory 324 is no longer in its original controller 212. If data is contained in the non-volatile memory 324, a determination may be made as to whether write operations involving data in the non-volatile memory 324 remain to be completed (step 612). That is, it may be determined whether the controller 212 had time to write the data that was contained in its write cache 312 to data storage device 204, despite the power outage. Alternatively, any data contained in the non-volatile memory 324 may be descrambled as described in connection with the following steps even if some or all of the write operations represented in the data stored on the non-volatile memory 324 were completed, to better ensure redundancy. As can be appreciated by one of skill in the art, any non-completed commands may be retried by the applicable host 108. If no write operations data in non-volatile memory 324 remain to be completed, the data storage system 104 may return to normal operations (step 608).

If it is determined that write operations should be completed, the data scrambling instructions and address scrambling instructions (i.e., the scrambling key or keys) are retrieved from one or more of the data storage devices 204 included in the data storage system 104 (step 616). Retrieval of the scrambling instructions is necessary, because instructions are intentionally held in volatile memory associated with the controller 212, to prevent or deter unauthorized descrambling of data held by the non-volatile memory 324. A unit of data may then be retrieved from the non-volatile memory 324 (step 620). The last set of data scrambling instructions used to scramble the retrieved unit of data is then applied (step 624). In particular, the last set of data scrambling instructions contained in the data scrambling mapping register 412 is applied to the retrieved unit of data. A determination may then be made as to whether the unit of data is completely descrambled (step 628). If the unit of data is not yet completely descrambled, additional sets of data scrambling instructions are applied, in reverse of the order in which they were used to scramble the unit of data until that unit of data is completely descrambled (step 632).

After completely descrambling a unit of data, the last set of address scrambling instructions used to scramble the address of that unit of data is applied to the address (step 636). At step 640, a determination is made as to whether the address of the unit of data has been completely descrambled. If the address has not been completely descrambled, additional sets of address scrambling instructions are applied in reverse of the order in which they were applied during scrambling (step 644). After the address of the unit of data is completely descrambled, the descrambled unit of data is placed in the write cache at the descrambled address (step 648).

A determination may then be made as to whether data remaining to be descrambled remains in the non-volatile memory 324 (step 652). If there is additional data in the non-volatile memory 324 that requires descrambling, the process may return to step 620, at which the next unit of data is retrieved. If all of the data in the non-volatile memory 324 has been descrambled and placed back in the write cache 312 of the controller, any pending write operations may be completed (step 656). The data storage system 104 may then resume normal operation (step 608).

As an example of the operation of an embodiment of the present invention, a scrambling key having a decimal value of 018365472 and having a binary value of 0001 1000 0011 0110 0101 0100 0111 0010 may be used. This example scrambling key may be obtained using any method for generating such keys, including random generation, pseudo-random generation and manual entry. In order to use this key in connection with the scrambling of units of data comprising bytes of data, it is divided into five pairs of three bit quantities as follows: 00||011 000||001|101||100|101||010|001||110|010. The result gives five translations, with two bits of waste. That is, each three-bit quantity has a value within the range of 0 to 7, which can be used to designate one of the bits within a byte of data. Furthermore, by pairing the three-bit quantities, bits within the byte of data whose values are to be swapped as part of a single translation are designated. In the present example, the data bit translations, ordered least significant bit-wise are as follows:

Translation 1: bit 2 is swapped with bit 6
Translation 2: bit 1 is swapped with bit 2
Translation 3: bit 5 is swapped with bit 4
Translation 4: bit 5 is swapped with bit 1
Translation 5: bit 0 is swapped with bit 3.

Therefore, in order to scramble a byte of data according to this example scrambling key, the indicated translations are performed in sequence, beginning with translation 1 and ending with translation 5.

An example of scrambling/descrambling a unit of data comprising a byte of data in which the example scrambling key given above is applied to obscure that unit of data is illustrated in FIG. 7. According to embodiments of the present invention, the most significant bit comprises bit 7, while the least significant bit comprises bit 0. For purposes of the present illustration, an example byte of data having as its original form 704 the binary value 0100 1001 will be scrambled. The first operation 708 involves swapping the value of the second bit with the value of the sixth bit, as indicated by the first translation defined by the scrambling key of the present example, to obtain the first translated form 712 if the unit of data, which has the binary value 0000 1101. The second operation 716 is then performed on the results of the first translation. Accordingly, performing the second operation 716, which comprises a translation in which the value of bit 1 is swapped with the value of bit 2, results in the second translated form 720 of the unit of data, which has the binary value 0000 1011. The third operation 724 is then performed on the results of the second translation. Accordingly, applying the third operation 724 of the present example, which specifies a translation in which the value held by bit 5 is exchanged with the value held by bit 4, applied to the second translated form 720 of the unit of data, results in no apparent change to the value of the data word, since bits 5 and 4 are both 0. Accordingly, following the third translation, the third translated form 728 of the unit of data has the binary value 0000 1011. The fourth operation 732 is a translation in which the value of bit 5 is swapped with the value of bit 1. Applying this fourth translation to the third translated form 728 of the unit of data results in rewriting the unit of data to obtain the fourth translated form 736 of the data, which has the binary value 0010 1001. Finally, the fifth operation 740, which is a translation in which the value held by bit 0 is swapped with the value held by bit 3, is applied to the fourth translated form 736 of the unit of data. Because bits 0 and 3 are both 1 following the fourth translation, application of the fifth translation 740 results in no apparent change to the value of the scrambled data word. Accordingly, following application of all of the indicated translations, the fully scrambled unit of data (i.e., the fifth translated form of the unit of data) 744 has the binary value 0010 1001.

In order to descramble the unit of data, the translation operations are performed in reverse order. Accordingly, descrambling includes first applying the fifth operation 740, which specifies that the value of bit 0 is to be swapped with the value of bit 3, to the fully scrambled form 744 of the unit of data 0010 1001. Because bits 0 and 3 of the scrambled unit of data both hold the value 1, there is no apparent change to the unit of data after applying the fifth operation 740. Next, the fourth operation 732, which specifies that the value held by bit 5 is to be swapped with the value held by bit 1, is applied to the fourth translated form 736 of the unit of data. This results in the third translated form 728 of the unit of data, which has the binary value 0000 1011. Next, the third operation 724, which swaps the values held by bits 5 and 4, is applied to obtain the second translated form 720 of the unit of data, which has the binary value 0000 1011. The second operation 716, which swaps the values of bits 1 and 2, is then applied to obtain the first translated form 712 of the unit of data, which has the binary value 0000 1101. Finally, the first operation 708, which specifies that the values of bits 2 and 6 are to be swapped, is performed to retrieve the original form 704 of the unit of data, 0100 1001.

In connection with the scrambling of an address in memory associated with the unit of data, a typical address may contain 32 bits. Accordingly, 10 bits are required to describe swapping bit values within an address. If, for example, a 32-bit value is used as an address scrambling key, three different bit translation pairs can be extracted from that key. Furthermore, the scrambling key used to define the data translations performed on a unit of data can also be used to define the translations to be performed on the address of a unit of data. Accordingly, using the scrambling key value 018365472 used above in connection with scrambling a unit of data, the address key can be divided into three pairs of 5-bit quantities, with 2 bits of waste, as follows:
00||01100|00011||01100|10101||00011|10010. Least significant bitwise, the first translation indicates that the value held at bit 18 of the address and bit 3 of the address are to be swapped. The second translation, which is performed on the results of the first translation indicates that the values of bit 21 and bit 12 are to be swapped. Finally, the third translation, which is performed on the results of the second translation indicates that bits 3 and 12 are to have their values swapped. Descrambling an address of data comprises applying the indicated translations to the scrambled address in reverse order to retrieve the original address. Application of these example translations to an example data address having a binary value 0001 0010 0001 0100 0101 0110 0111 1000, is illustrated in FIG. 8.

Figure 8:
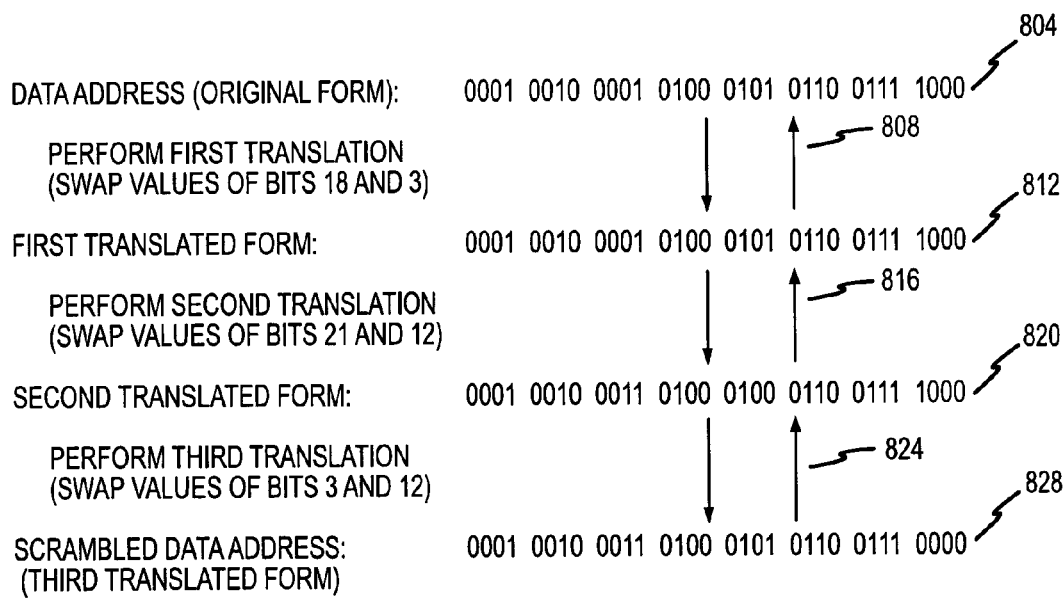
FIG. 8 illustrates the scrambling (and descrambling) of an example data address in accordance with an exemplary embodiment of the present invention.

As shown in FIG. 8, the original form 804 of the data address is altered by performing the first operation 808, which in the present example comprises swapping the values of bits 18 and 3 to obtain the first translated form 812 of the data address. The second operation 816, which comprises swapping the values of bits 21 and 12 in the present example, is then performed on the first translated form 812 of the data address, to obtain the second translated form 820 of the data address. Finally, according to the present example, a third operation 824, comprising swapping the values of bits 3 and 12 of the second translated form 820 of the data address is performed to obtain the scrambled address (i.e., the third translated form of the address) 828. In order to descramble the data address, the translation operations are performed in reverse order. Accordingly, the third operation 824 is performed on the scrambled data address 828 to obtain the second translated form 820 of the data address. The second operation 816 is performed on the second translated form 820 to obtain the first translated form 812 of the data address. Finally, the first operation 808 is performed on the first translated form 812 to obtain the data address in its original form 804.

From the description and examples provided herein, it can be appreciated that embodiments of the present invention allow data to be obscured by swapping bit values encoding or defining the unit of data according to a scrambling key. In addition or alternatively, a scrambling key may be used to define bits in an address of a unit of data whose values are to be swapped to obscure the associated unit of data. In accordance with embodiments of the present invention in which both the unit of data itself and the associated address for that unit of data are scrambled, the same scrambling key may be used to define the bits whose values are swapped. Where both a unit of data and an address associated with the unit of data are scrambled, the scrambling of the unit of data itself can be performed after, during or before the scrambling of the associated address.

Furthermore, it can be appreciated that the bit swapping operation can be performed using suitably configured shift registers. Accordingly, embodiments of the present invention are capable of providing a relatively inexpensive and fast mechanism or procedure by which data can be obscured before being written to memory, or unobscured upon retrieval from memory. Furthermore, embodiments of the present invention do not require a CPU and software in order to implement scrambling as described herein. In addition, data storage arrays are, according to embodiments of the present invention, logically tied to the non-volatile memory. Because scrambling of data in accordance with embodiments of the present invention is proprietary, descrambling cannot be performed using standard commercial decoding methods. Accordingly, embodiments of the present invention provide a number of advantages over conventional data encryption, such as the data encryption standard (DES).

Although certain of the examples provided herein have described units of data comprising bytes and memory systems using 32-bit addresses, it should be appreciated that such examples are provided for illustration purposes only, and are not limiting. Furthermore, the specific numerical examples provided are given for illustration purposes and are not in any way intended to limit embodiments of the present invention. In addition, although examples have been given in the context of back-up non-volatile memory in RAID storage systems, it should be appreciated that embodiments of the present invention may have application to any system or method in which it is desirable to obscure data.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for obscuring data in memory, comprising:
   storing an identifier in first and second memories, wherein said identifier is associated with a controller;
   storing a first scrambling key in said second memory;
   determining, by said controller, whether a power outage is indicated, wherein said controller comprises a write cache;
   reading first original data from the write cache, wherein said first original data includes a first information and a first address;
   scrambling said first original data as indicated by said first scrambling key;
   determining from said first scrambling key a second pair of values comprising a designation of bit locations of a third bit and a fourth bit of said first original data,
   in response to determining that said power outage is indicated, storing said scrambled first original data in said first memory;
   wherein said first memory is associated with said controller, wherein said scrambling includes determining from said first scrambling key at least a first pair of values comprising a designation of bit locations of a first bit and a second bit of said first original data, and operating on said first original data to obtain said scrambled first original data, wherein said operating includes, with respect to said first original data, swapping a value of said first bit designated by said first scrambling key and a value of said second bit designated by said first scrambling key, wherein said swapping a value of said first bit designated by said first scrambling key and a value of said second bit designated by said first scrambling key provides first partially scrambled data, and wherein said operating on said first original data to obtain said scrambled first original data further includes, with respect to said first partially scrambled data, swapping a value of said third bit designated by said first scrambling key and a value of said fourth bit designated by said first scrambling key to obtain one of second partially scrambled data and said first scrambled data.

2. The method of claim 1, further comprising:
   determining by said controller that power has just been restored and said scrambled first original data is stored in said first memory;
   retrieving said first scrambling key from said second memory, wherein said second memory is separate from said first memory;
   retrieving said scrambled first original data from said first memory;

descrambling said scrambled first original data using said retrieved first scrambling key to recover said first original data.

3. The method of claim 1, wherein said first scrambling key is used to scramble multiple pieces of data.

4. The method of claim 3, wherein said first scrambling key is used to descramble said multiple pieces of data.

5. The method of claim 1, wherein said first original data comprises a first unit of user data.

6. The method of claim 1, wherein said first original data comprises a first address associated with a unit of user data.

7. The method of claim 1, further comprising:
with respect to said first scrambled data, swapping a value of said third bit designated by said first scrambling key and a value of said fourth bit designated by said first scrambling key to obtain said first partially scrambled data; and
after obtaining said first partially scrambled data, swapping a value of said first bit designated by said first scrambling key and a value of said second bit designated by said first scrambling key to recover said first original data.

8. The method of claim 1, wherein said first original data comprises a first unit of user data, wherein said first unit of user data is associated with first address data, and wherein said first bit and said second bit are associated with said first unit of user data, said method further comprising:
determining from said first scrambling key a second pair of values comprising a designation of bit locations of a third bit and a fourth bit of said first address data;
swapping a value of said third bit of said first address data designated by said first scrambling key and a value of said fourth bit of said first address data designated by said first scrambling key to obtain one of first partially scrambled address data and scrambled address data.

9. The method of claim 1, wherein said first original data comprises a first unit of user data, wherein said first unit of user data is associated with first address data, and wherein said first bit and said second bit are associated with said first unit of user data, said method further comprising:
determining from a second scrambling key a second pair of values comprising a designation of bit locations of a third bit and a fourth bit of said first address data;
swapping a value of said third bit of said first address data designated by said second scrambling key and a value of said fourth bit of said first address data designated by said second scrambling key to obtain one of first partially scrambled address data and scrambled address data.

10. The method of claim 1, further comprising:
storing said first scrambling key in a third memory, wherein said third memory provides a data cache memory for said controller associated with a storage device, and wherein said controller and said storage device are included in a data storage system.

11. The method of claim 9, wherein said first memory comprises removable memory.

12. The method of claim 9, wherein said first memory is nonvolatile.

13. The method of claim 10, wherein said controller is associated with said identifier.

14. The method of claim 1, wherein said first original data comprises a unit of user data, and wherein said unit of user data comprises a byte or a word of data.

15. A data storage system controller, comprising:
a processor;
a first non-volatile memory, wherein said first non-volatile memory is operable to store scrambled data;
a data mapping register, wherein said data mapping register is operable to store a key used to scramble data, and wherein said data mapping register is comprised of volatile memory;
code/decode logic, wherein said code/decode logic is configured to swap two bits of first data according to at least a first value pair held in said data mapping register in connection with creation of first scrambled data in response to an instruction received from said processor; and
detection logic, wherein said detection logic is configured to detect a power outage, and wherein in response to detecting said power outage, said first scrambled data is stored in said first non-volatile memory;
wherein said data mapping register contains a number of value pairs, including at least first and second value pairs, wherein said swap of said two bits of first data according to said first value pair results in first translated data, and wherein said code/decode logic is configured to swap two bits of said first translated data to obtain second translated data.

16. The controller of claim 15, wherein said second translated data comprises said first scrambled data.

17. The controller of claim 15, wherein said code/decode logic is configured to perform more than two swaps of bit values in sequence in order to obtain said first scrambled data.

18. The controller of claim 15, wherein said code/decode logic is configured to perform said sequence of bit swaps performed on said scrambled data in reverse order to retrieve said first data.

19. The controller of claim 15, wherein said controller is in communication with at least a first storage device, wherein user data and said scrambling key are stored on said first storage device, wherein said scrambling key defines said values held in said data mapping register.

20. A data storage system, comprising:
a processor subsystem, wherein the processor subsystem detects a loss of power to the data storage system;
a first memory for storing at least a first and a second pair of values related to at least a first and a second data scrambling operation;
a second memory for storing first scrambled data, wherein the first scrambled data is stored in the second memory in response to detecting the loss of power; and
a third memory for storing at least an identifier associated with the second memory and the first and second pair of values related to at least the first and the second data scrambling operation, wherein the second and the third memories are non-volatile memories;
wherein in response to detecting the loss of power to the data storage system, the processor subsystem swaps a value of a first bit of first original data designated by a first value included in said first pair of values and a value of a second bit of said first original data designated by a second value included in said first pair of values in connection with creating first partially scrambled data, wherein after creating first partially scrambled data, the processor swaps a value of a third bit of first original data designated by a first value included in said second pair of values and a value of a fourth bit of said first original data designated by a second value included in said second pair of values in connection with creating second partially scrambled data.

21. The data storage system of claim 20, further comprising:
an array of storage devices for storing user data, wherein the array of storage devices stores data on multiple storage devices according to a RAID level;

wherein a storage controller comprises the processor subsystem and the first and second memories, wherein the third memory comprises the array of storage devices, wherein the storage controller writes the user data to the array of storage devices.

* * * * *